(12) United States Patent
Dagh et al.

(10) Patent No.: US 8,863,885 B2
(45) Date of Patent: Oct. 21, 2014

(54) WHEEL HUB UNIT

(75) Inventors: Ingemar Dagh, Göteborg (SE); Martin Sjöholm, Växjö (SE); Lena Larsson, Västra Frölunda (SE)

(73) Assignee: Volvo Lastvagnar AB, Göteborg (SE)

( * ) Notice: Subject to any disclaimer, the term of this patent is extended or adjusted under 35 U.S.C. 154(b) by 108 days.

(21) Appl. No.: 13/499,296

(22) PCT Filed: Oct. 2, 2009

(86) PCT No.: PCT/SE2009/000434
§ 371 (c)(1),
(2), (4) Date: Mar. 30, 2012

(87) PCT Pub. No.: WO2011/040843
PCT Pub. Date: Apr. 7, 2011

(65) Prior Publication Data
US 2012/0187747 A1  Jul. 26, 2012

(51) Int. Cl.
*B60K 17/14* (2006.01)
*B60K 7/00* (2006.01)
*F16C 19/38* (2006.01)
*F16C 33/66* (2006.01)
*F16C 33/78* (2006.01)
*F16C 33/80* (2006.01)

(52) U.S. Cl.
CPC ............ *B60K 7/0015* (2013.01); *F16C 19/386* (2013.01); *F16C 33/6681* (2013.01); *F16C 33/7813* (2013.01); *F16C 33/7886* (2013.01); *F16C 33/80* (2013.01); *B60K 2007/0038* (2013.01); *B60K 2007/0092* (2013.01); *F16C 2326/02* (2013.01); *Y10S 903/906* (2013.01)

USPC .............. 180/308; 180/65.51; 903/906

(58) Field of Classification Search
USPC .................... 180/308, 65.51; 903/906
See application file for complete search history.

(56) References Cited

U.S. PATENT DOCUMENTS

| | | | |
|---|---|---|---|
| 3,749,195 A | | 7/1973 | Vegners |
| 3,812,928 A | * | 5/1974 | Rockwell et al. .......... 180/65.51 |
| 3,892,300 A | * | 7/1975 | Hapeman et al. .......... 180/65.51 |
| 4,053,036 A | * | 10/1977 | Branham et al. ............ 192/13 R |
| 4,330,045 A | * | 5/1982 | Myers ........................ 180/65.51 |
| 4,799,564 A | * | 1/1989 | Iijima et al. ................ 180/65.51 |
| 4,913,258 A | * | 4/1990 | Sakurai et al. ................. 180/242 |
| 5,156,579 A | * | 10/1992 | Wakuta et al. ................. 475/161 |
| 5,163,528 A | * | 11/1992 | Kawamoto et al. ........ 180/65.51 |
| 5,735,364 A | * | 4/1998 | Kinoshita ..................... 180/308 |
| 6,598,694 B2 | * | 7/2003 | Forster .......................... 180/305 |
| 6,688,417 B2 | * | 2/2004 | Hansell ........................ 180/305 |
| 7,393,140 B2 | * | 7/2008 | Norimatsu et al. ........... 384/448 |
| 7,527,113 B2 | * | 5/2009 | Jenkins ....................... 180/65.51 |

(Continued)

OTHER PUBLICATIONS

International Search Report for corresponding International application No. PCT/SE2009/000434.

*Primary Examiner* — Jeffrey J Restifo
(74) *Attorney, Agent, or Firm* — WRB-IP LLP

(57) ABSTRACT

A wheel hub unit includes a wheel hub, a hydraulic motor and at least one bearing for supporting the wheel hub and the hydraulic motor. The wheel hub unit comprises a first seal for protecting the at least one bearing from hydraulic oil from the hydraulic motor.

23 Claims, 5 Drawing Sheets

(56) References Cited

U.S. PATENT DOCUMENTS

| | | | |
|---|---|---|---|
| 7,622,836 B2 * | 11/2009 | DeVeny et al. | 310/75 C |
| 7,828,095 B2 * | 11/2010 | Murata et al. | 180/65.51 |
| 7,938,211 B2 * | 5/2011 | Yoshino et al. | 180/65.51 |
| 8,133,143 B2 * | 3/2012 | Schoon | 475/156 |
| 8,155,834 B2 * | 4/2012 | Murahashi | 701/36 |
| 8,160,773 B2 * | 4/2012 | Nabeshima et al. | 701/36 |
| 8,230,772 B2 * | 7/2012 | Kirby | 91/487 |
| 8,245,803 B2 * | 8/2012 | Murata et al. | 180/65.51 |
| 8,449,424 B2 * | 5/2013 | Schoon | 475/153 |
| 8,581,455 B2 * | 11/2013 | Woolmer | 310/54 |
| 8,581,457 B2 * | 11/2013 | Takahashi et al. | 310/67 R |
| 2005/0236198 A1 * | 10/2005 | Jenkins | 180/65.5 |
| 2008/0035399 A1 * | 2/2008 | Murata et al. | 180/65.5 |
| 2009/0078528 A1 * | 3/2009 | Uzawa et al. | 192/12 D |
| 2009/0230649 A1 | 9/2009 | Ziech | |
| 2009/0297084 A1 * | 12/2009 | Ziech | 384/551 |
| 2009/0312134 A1 * | 12/2009 | Schoon | 475/154 |
| 2010/0140020 A1 * | 6/2010 | Murahashi | 184/6.12 |
| 2012/0187747 A1 * | 7/2012 | Dagh et al. | 301/6.5 |

* cited by examiner

WHEEL HUB UNIT

BACKGROUND AND SUMMARY

The invention relates to a wheel hub unit comprising a wheel hub, a hydraulic motor and at least one bearing for supporting the wheel hub and the hydraulic motor.

Hydraulic motors for driving wheels of a vehicle are generally known in the art. According to a known wheel hub unit, a steering knuckle is pivotably connected to a kingpin and the hydraulic motor is attached to the steering knuckle at an opposite end of the steering knuckle in relation to the kingpin. The steering knuckle has a cylindrical shape and comprises interior channels for transmitting hydraulic oil to the hydraulic motor. Two bearings are arranged around the steering knuckle at an axial distance from each other.

A typical range of operation of a hydraulic motor is when the vehicle is running at a speed below a speed limit, for instance below 30 km/h. At higher speeds the hydraulic motor is in a freewheeling mode and a counter pressure is applied for disengaging the pistons in the hydraulic motor. When the vehicle decelerates and the vehicle speed passes said speed limit, the hydraulic motor can be engaged again. At the transition between the freewheeling mode and the operation mode pressure spikes in the millisecond range can occur in which the peak pressure is by far exceeding the normal pressure during operation. Such pressure spikes can reach 100 bar, for instance.

According to the known wheel hub unit, a restriction is provided between the bearings and the bearing which is arranged closest to the hydraulic motor is adapted to let the hydraulic oil pass through to said restriction during said pressure spikes. One problem with this design is that the bearing which is arranged closest to the hydraulic motor will have a relatively short life.

It is desirable to provide a wheel hub unit comprising a hydraulic motor, which creates conditions for a long life of the wheel hub unit.

According to an aspect of the present invention, a wheel hub unit comprises a wheel hub, a hydraulic motor and at least one bearing for supporting the wheel hub and the hydraulic motor characterized in that the wheel hub unit comprises a first seal for protecting the at least one bearing from hydraulic oil from the hydraulic motor.

Advantageously, by protecting the at least one bearing of the wheel hub unit with the first seal the bearing is not exposed to high pressure lubricant such as hydraulic oil and is particularly not exposed to pressure spikes with high peak pressure. Further, it creates conditions for using a conventional wheel bearing which employs grease as lubricant instead of hydraulic oil from the hydraulic motor. Grease greased bearings can be sealed to the ambient with well-proven seals. Grease greased bearings have favourably a low friction and less abrasive particles are present in the bearing, thus reducing the fatigue of the bearings. Leakage of hydraulic oil through the seal of the bearing or complex seals for sealing the bearing against the ambient can be avoided.

According to a favourable embodiment of the invention, the wheel hub unit comprises means for protecting the first seal from pressure spikes transmittable by the hydraulic oil of the hydraulic motor. This arrangement creates conditions for using soft seals for sealing the bearing section despite high pressure spikes during operation of the hydraulic motor.

According to a favourable embodiment according to the invention, the protection means may comprise a passage between the hydraulic motor and the first seal, wherein hydraulic oil may enter said passage. The passage may be configured for protecting the first seal from pressure spikes transmittable by the hydraulic oil of the hydraulic motor when passing from a freewheeling mode at high speeds to an operation mode at a speed range where the hydraulic motor is operative. The hydraulic oil passage may comprise a region which causes a change of direction of the hydraulic oil for protecting the first seal from said pressure spikes particularly when entering the oil passage in a pressure spike. By changing the direction of the hydraulic oil entering the passage during a pressure spike counteracts the effects of the pressure spike and reduces stress to the components in the oil passage. The change of direction is preferably a relatively sharp change, such as a 90° bend of the passage. The change of direction is preferably at least a 45° bend, and specifically at least a 60° bend of the passage. The passage may be configured with various means, such as for instance, a long extension of the passage, sealing means, restrictions in the passage. Favourably, by protecting the first seal from pressure spikes the first seal can be a standard soft seal. By providing a region causing a change of direction in the hydraulic oil passage a pressure load of the first seal and the effect of pressure spikes can be effectively reduced in the hydraulic oil passage. The hydraulic oil passage may be arranged so that an entrance of the hydraulic oil passage at the hydraulic motor is positioned at a different radial position than an exit of the hydraulic oil passage at the first sealing. Advantageously, the hydraulic oil may enter the hydraulic motor in a central region of the steering knuckle and the exit may be provided at an outer surface of the steering knuckle, resulting in a compact arrangement.

According to a further favourable embodiment according to the invention, the hydraulic oil passage may comprise a first section extending in an axial direction of the wheel hub unit and a second section extending in a radial direction of the wheel hub unit. At the transition between the first and second section the hydraulic oil has to change its direction thus reducing detrimental effects of a pressure spike in the oil passage. The hydraulic oil passage can be designed in an expedient way to reduce pressure spikes.

According to another favourable embodiment according to the invention, the protection means may comprise a second seal which is arranged between the hydraulic motor and the first seal for protecting the first seal from pressure spikes transmittable by the hydraulic oil of the hydraulic motor. Expediently, the second seal may be arranged in said hydraulic oil passage. The second seal can separate the hydraulic oil passage into a high pressure region at one side of the second seal away from the first seal and a low pressure region between the second seal and the first seal. Favourably, the protection of the first seal is improved by the second seal which may be conditioned to seal against a large pressure difference, and the axial length of the hydraulic oil passage can be reduced. This results in a compact arrangement of the wheel hub unit.

According to a favourable embodiment according to the invention, a first drainage channel may be arranged between the first seal and the second seal. Additionally or optionally a second drainage channel may be arranged in front of the second seal. The first drainage channel between the first and the second seal additionally reduces the action of pressure spikes which may pass the second seal. Such oil is discharged to the first drainage channel. The second drainage channel in front of the second seal further reduces an influence of a pressure spike on the first seal. Hydraulic oil entering the hydraulic oil passage is discharged to the second drainage channel thus reducing the pressure load of the second seal. Favourably, the both drainage channels can join in the same drainage channel in the knuckle on which the wheel hub unit is arranged. The first and second drainage channels can be embodied with of without a flow restriction for the hydraulic oil. Expediently, the first drainage channel may be equipped with a restriction device in order to reduce or avoid a pressure load from the joint drainage channel in the knuckle when oil in a pressure spike is discharged to the second drainage channel.

According to a favourable embodiment of the invention, the second seal can comprise a soft seal portion. Expediently, the soft seal portion can provide a defined leakage thus easing requirements for the design of the second seal for a reduction of a pressure spike. By providing a defined leakage, the pressure of the hydraulic oil between the first and the second seal can be controlled. A complex and expensive seal arrangement for providing a fluid tight second seal can be avoided.

According to a favourable embodiment according to the invention, the soft seal portion can be arranged at a radial inner side of a housing which is connected to the wheel hub and configured to rotate with the wheel hub. It is of advantage that the housing can hold the second seal securely in place even during very high pressure spikes. The housing can also take over load caused by the pressure spike thus protecting the second seal from direct actions of the pressure spike. The soft seal portion is configured to rotate with the housing.

According to a favourable embodiment according to the invention, the soft seal portion can be arranged around a spacer ring which can be connected in a rotatably fixed manner to a steering knuckle. The same spacer ring can be used to distribute hydraulic oil into a high pressure section of the hydraulic oil passage. A compact arrangement is achieved.

According to a favourable embodiment according to the invention, the second seal can comprise a leakage channel with a predefined leakage. In an advantageous development, the leakage channel can be arranged between the soft seal portion and the spacer ring. Expediently, a defined pressure level can be established between the second seal and the first seal by a proper design of the leakage channel. As the soft seal portion can rotate with the housing, hydraulic oil in the leakage channel is at the same time a lubricant for the soft seal portion during rotation.

According to a further favourable embodiment according to the invention, a radial inner surface of the first seal is positioned on a radial different, preferably radial larger distance from a wheel hub rotational axis than the leakage channel. The radial different position of the leakage channel with respect to the first seal is of advantage because if pressure spikes transit the channel in unfavourable circumstances, an oil jet may be generated which hits a wall portion of the hydraulic oil channel in the low pressure region of the oil channel and not the first seal. The radial larger distance from the wheel hub rotational axis is of advantage because the first discharge channel is at a radial smaller distance from the wheel hub rotational axis than the leakage channel. As a result, oil can be discharged to the first drainage channel without passing the first seal.

According to a favourable embodiment according to the invention, the wheel hub unit may comprise two bearings and the hydraulic motor may be arranged beside the two bearings in an axial direction of the wheel hub unit. It is of advantage that the two bearings can be constituents of a standard wheel bearing for wheels without a hydraulic motor.

According to a further favourable embodiment according to the invention, the at least one bearing can be formed by a taper rolling bearing. Advantageously, the at least one bearing can be constituents of a standard wheel bearing for wheels without a hydraulic motor.

According to another favourable embodiment according to the invention, the at least one bearing may be configured to be greased by grease. By lubricating the at least one bearing with grease a long lasting bearing arrangement with low friction and low fatigue can be achieved. As such a standard wheel bearing is sealed with soft seals, the invention provides a favourable combination of a hydraulic motor and a standard grease greased wheel bearing.

According to still another favourable embodiment according to the invention, the hydraulic motor may be formed by a radial piston hydraulic motor. A radial piston hydraulic motor has a compact size which is favourable for wheel motors.

According to a further favourable embodiment according to the invention, the first seal may be a soft seal. Favourably, the first seal can be a standard seal as the pressure differences on both sides of the first seal can be maintained comparably small.

The invention is particularly useful for commercial vehicles, e.g. tractor vehicles, or construction equipment where wheel motors are helpful for providing a sufficient maneuverability of the vehicle.

BRIEF DESCRIPTION OF THE DRAWINGS

The present invention together with the above-mentioned and other objects and advantages may best be understood from the following detailed description of the embodiment (s), but not restricted to the embodiments, wherein is shown schematically.

DETAILED DESCRIPTION

Figure 1A:
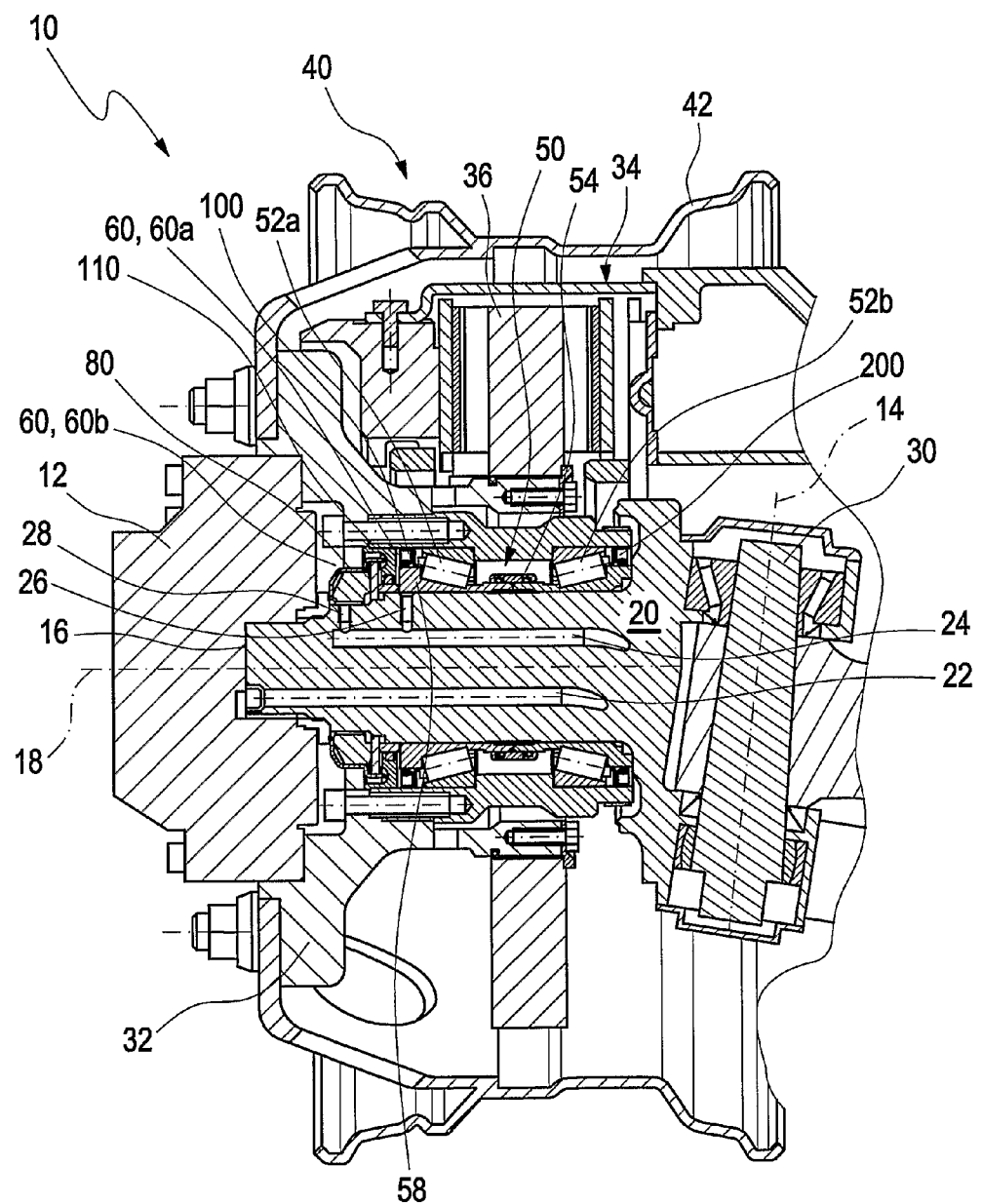
FIG. 1a, 1b a side cut through a wheel hub arrangement showing an example embodiment of a wheel hub unit according to the invention (FIG. 1a), and an enlarged view of a detail of FIG. 1a depicting a first and a second seal in a hydraulic oil passage (FIG. b)

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 1B:
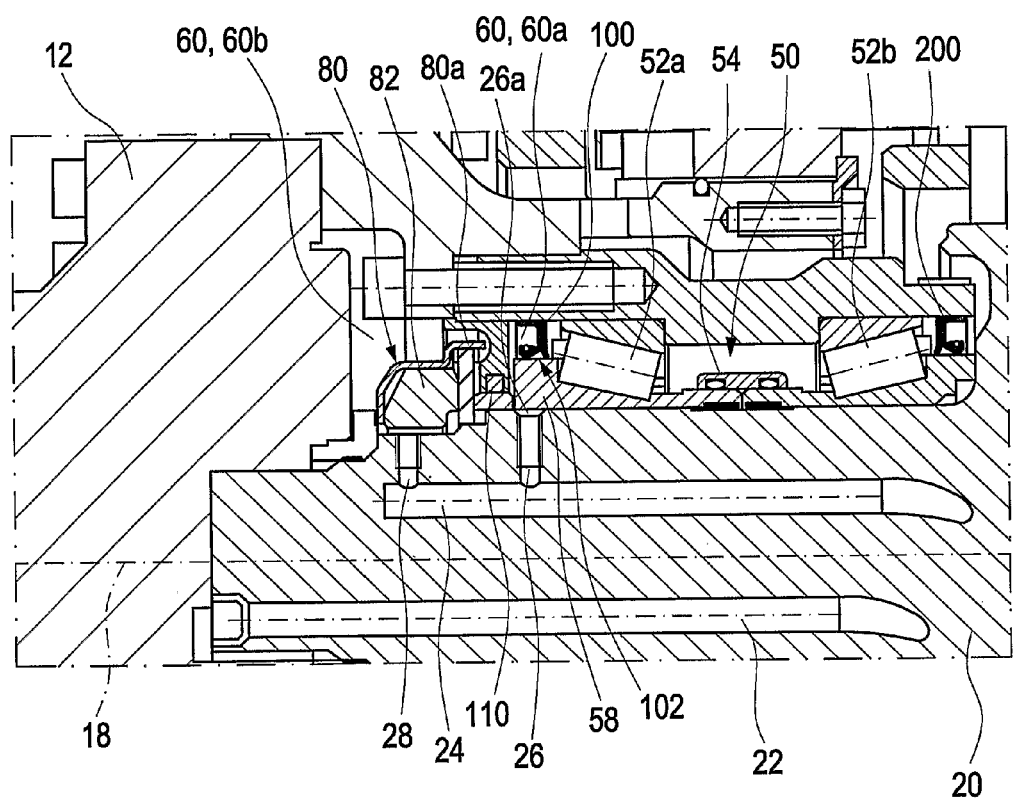

FIG. 1a depicts in a schematic side view a cut through a wheel arrangement illustrating an example embodiment of a wheel hub unit 10 according to the invention with a symmetrical arrangement about an axis 18, the wheel hub unit 10 comprising a hydraulic motor 12 and a bearing section 50 for supporting a wheel hub 40 with a rim 42 for supporting a tyre (not shown) and the hydraulic motor 12 on a non-rotating steering knuckle 20 with a king pin 30. The king pin 30 is pivotable about an axis 14. FIG. 1b shows enlarged views of details of the arrangement for clarity. The wheel arrangement is, for example, associated with a vehicle such as a truck or a construction vehicle or the like.

The hydraulic motor 12 is arranged in an axially outermost position on the steering knuckle 20 opposite to the king pin 30. The steering knuckle 20 is configured to distribute hydraulic oil from an axially inner position to the hydraulic motor 12 via internal channels, which is shown in more detail in FIG. 4. The steering knuckle 20 is operatively connected between the hydraulic motor 12 and the king pin 30. The wheel hub 40 is supported by bearings 52*a*, 52*b* of the bearing section 50 on the steering knuckle 20. The bearings 52*a*, 52*b* are arranged with an axial distance to each other. Thus, the bearings 52*a*, 52*b* are positioned radially between the steering knuckle and a rotational part in the wheel hub unit.

The bearing section 50 comprises two bearings 52*a*, 52*b* arranged at both sides of a centre seal 54 with an axial distance to each other. The bearing section 50 is sealed towards the wheel motor 12 with a first seal 100 and to the outside by a further seal 200. Each of the bearings 52*a*, 52*b* is formed as a taper rolling bearing moving on a race-way of an inner ring 58 surrounding and rotationally rigidly connected to the steering knuckle 20. The bearings 52*a*, 52*b* may be configured to be lubricated with grease as the pressure in the bearing section 50 is at a low ambient pressure level.

The first seal 00 is positioned radially between the inner ring 58 of the bearing 52*a* and a rotational part in the wheel hub unit. Thus, an inner portion of the first seal 100 is arranged radially outside the inner ring 58 and in contact with the inner ring 58. Further, the first seal 00 comprises a resilient member configured to urge a portion of the first seal 100 against a surface to be sealed against. The resilient member is preferably formed by a metal ring. Further, the first seal 100 preferably comprises a metal body with a rubber part vulcanized thereto.

The hydraulic motor 12 is arranged axially beside the two bearings 52*a*, 52*b* of the bearing section 50 in an axial direction of the wheel hub unit 10.

The wheel hub unit 10 comprises means 110, 60 for protecting the first seal 100 from pressure spikes transmittable by the hydraulic oil of the hydraulic motor 12. In other words, the wheel hub unit comprises a pressure spike protection structure 110, 60 between the first seal 100 and the hydraulic motor 12.

In the steering knuckle 20 channels 22, 24 are arranged, wherein a supply channel 22 is a "freewheeling channel" which supplies hydraulic oil to the hydraulic motor 12 for disengaging the hydraulic motor 12 at higher speed in its freewheeling mode. The drainage channel 24 is provided for discharging hydraulic oil from a hydraulic oil passage 60. The hydraulic motor 12 is by way of example formed by a radial piston hydraulic motor.

The hydraulic motor 12 is arranged at a front face 16 of the steering knuckle 20 by screws engaging a flange 32 arranged at the steering knuckle 20. The steering knuckle 20 is further surrounded by a brake disk 36 of a brake unit 34 as generally known in the art.

The hydraulic oil passage 60 is arranged between the hydraulic motor 12 and the first seal 100 adjacent to the bearing section 50. The passage 60 is configured for protecting the first seal 100 from pressure spikes transmittable by the hydraulic oil of the hydraulic motor 12 during such pressure spikes. The first seal 100 is arranged for protecting the bearings 52*a*, 52*b* in the bearing section from hydraulic oil coming from the hydraulic motor 12 during pressure spikes through the oil passage 60. Hydraulic oil may enter said passage 60 when the hydraulic motor 12 is activated after a freewheeling mode at a higher vehicle speed. By way of example the first seal 100 can be embodied as a soft seal. Particularly it can be a standard soft seal as used for the outer seal 200 of the bearing section 50.

Typically, the hydraulic oil in the oil passage 60 has a pressure of 3 bar during a freewheeling mode and is unpressurized during normal operation of the hydraulic motor 12. However, high pressure spikes can be generated when the operation of the hydraulic motor 12 is started after a freewheeling mode, wherein the pressure spikes can rise up to e.g. 100 bar for several milliseconds.

A second seal 110 is arranged in the oil passage 60 between the hydraulic motor 12 and the first seal 100. The second seal 110 is adjacent a lock washer 80 which covers a nut 82 (FIG. 2) for preventing the nut 82 from rotation.

The second seal 110 separates the oil passage 60 in a high pressure region 60*b* between the hydraulic motor 12 and the second seal 110 and a low pressure region 60*a* between the second seal 110 and the first seal 100. The pressure in the low pressure region 60*a* can be limited to e.g. 1 bar, wherein in the high pressure region 60*b* the pressure can rise up to the maximum peak pressure without detrimental effects on the first seal 100.

Oil in the low pressure region 60*a* can be discharged in a first radial drainage channel 26 in the steering knuckle 20, which is in fluid connection with the drainage channel 24. Oil in the high pressure region 60*b* can be discharged in a second radial drainage channel 28 in the steering knuckle 20, which is in fluid connection with the same drainage channel 24. The first drainage channel 26 can comprise a restriction to block oil entering the low pressure region 60*a* from the joint drainage channel 24.

The hydraulic oil passage 60 comprises a region 62 where oil entering the high pressure region 60*b* of the oil passage 60 in a pressure spike experiences a change of direction. Changing the direction reduces the effect of the pressure spike in the high pressure region 60*b* and consequently also in the low pressure region 60*a*.

Figure 2:
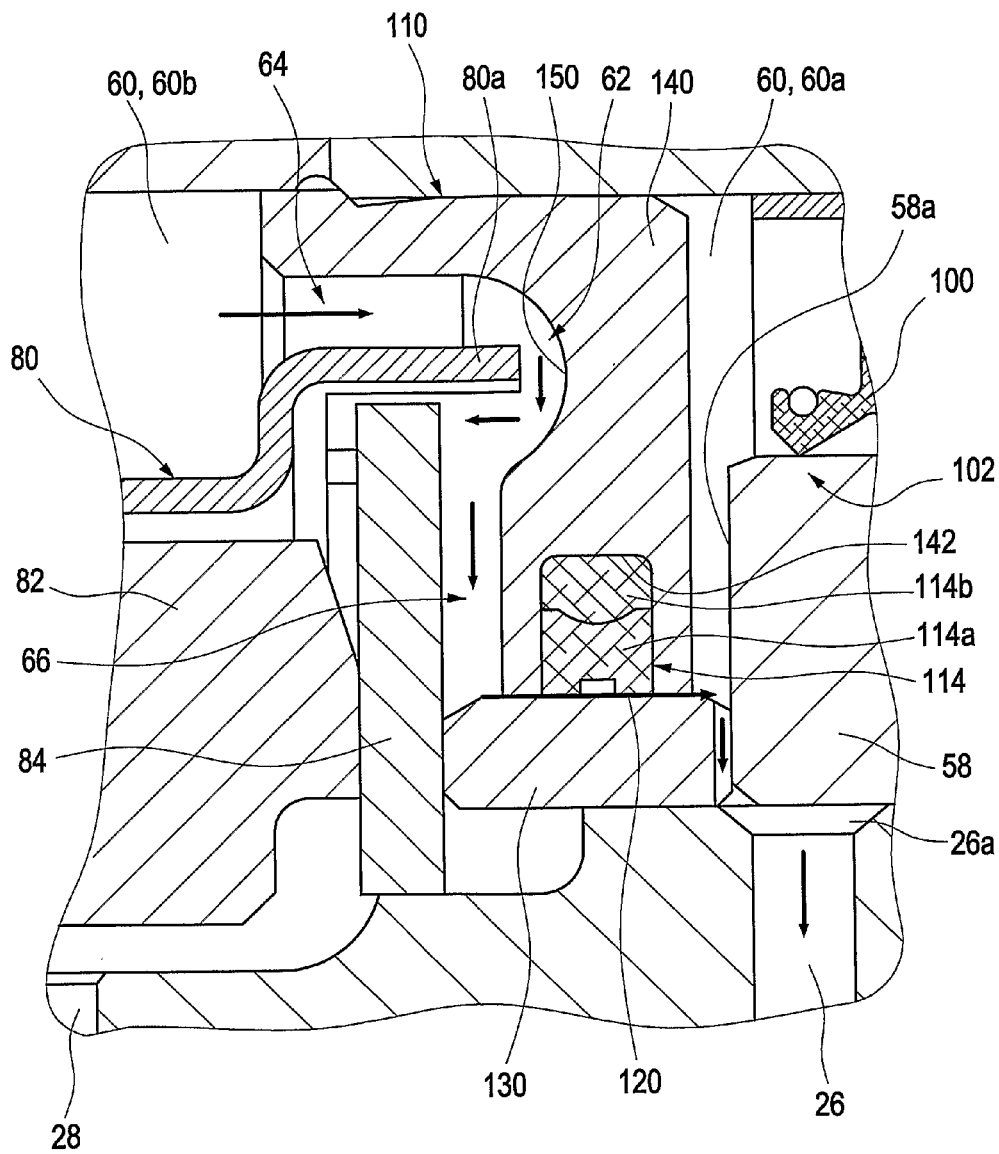
FIG. 2 a detailed view of an example embodiment of a second seal shown in FIGS. 1a and 1b arranged in an oil passage.

Referring now to FIG. 2 the arrangement of the second seal 110 in the oil passage 60 shown in FIGS. 1*a* and 1*b* is depicted in a more enlarged view.

The second seal 110 comprises a radial inner support in form of a rigid spacer ring 130 and a rigid radial outer housing 140. A soft seal portion 114 is arranged in a groove 142 arranged at a radial inner side of the rigid housing 140 and surrounds the rigid spacer ring 130. The rigid housing 140 is connected to the wheel hub 40 wherein the rigid housing 140 rotates with the wheel hub 40 whereas the rigid spacer ring 130 is connected to the knuckle 20 and remains stationary with the knuckle 20.

The groove 142 is arranged in radial direction and holds the soft seal portion 114 in place even when very high pressure spikes occur. The soft seal portion 114 is split in a radial outer segment 114*b* and a radial inner segment 114*a*. By providing the soft seal portion 114 with two segments 114*a*, 114*b* it is possible to provide a defined leakage through the soft seal portion 114 which controls the pressure level in the low pressure region 60*a* of the hydraulic oil channel 60. Particularly, the radial inner segment 114*a* can be configured to have a defined leakage.

Particularly, the radial outer segment 114*b* can be a soft flexible part, whereas the radial inner segment 114*a* may be designed stiffer than the radial outer segment 114*b* to withstand wear and heat.

As mentioned above, the second seal 110 separates the hydraulic oil passage 60 in two parts, the low pressure region 60*a* and the high pressure region 60*a*. As can be seen in the Figure, the hydraulic oil passage 60 comprises in the high pressure region 60*b* a first section 64 extending in an axial direction of the steering knuckle 20 between the lock washer 80. A second section 66 extends in a radial direction of the steering knuckle 20 between a washer 84 and the second seal 110 as indicated by arrows in the respective sections 64, 66.

Oil entering the high pressure region 60b of the oil passage 60 from the hydraulic motor 12 in a pressure spike first moves in the axial direction in section 64 before moving in radial direction in section 66. Between the two sections 64, 66 the transition between the axial and the radial direction is enforced by a transition region 62 which in this embodiment is caused by a groove 150 which is arranged in axial direction.

The lock washer 80 completely covers the lock nut 82 and the washer 84 in the high pressure region 60b. The lock washer 80 protrudes with its free end 80a into the groove 150 and forms a fluid passage enforcing a direction change of oil entering the oil passage in a spike.

The hydraulic oil can leak through the second seal 10 through a defined leakage channel 120 arranged between the radial inner side of the soft seal portion 114, particularly the inner segment 114a, and the radial outer surface of the rigid spacer ring 130. The oil in the leakage channel 120 is also a lubricant for the soft seal portion 114 during rotation of the wheel hub 40.

Oil in the high pressure region 60b is predominantly discharged in the second drainage channel 28 so that only a small amount of oil protrudes to the leakage channel 120. Oil passing through the leakage channel 120 to the low pressure region 60a of the hydraulic oil passage 60 is predominantly discharged to the first drainage channel 26.

The first seal 100, particularly its radial inner surface 102 is arranged at a radial larger distance from the wheel hub rotational axis 18 than the soft seal portion 114, particularly the leakage channel 120. If under unfavourable conditions an oil jet occurs at the output of the leakage channel 120 the oil jet will not hit the first seal 100 but an end face 58a of the inner ring 58 of the bearing section 50.

Figure 3:
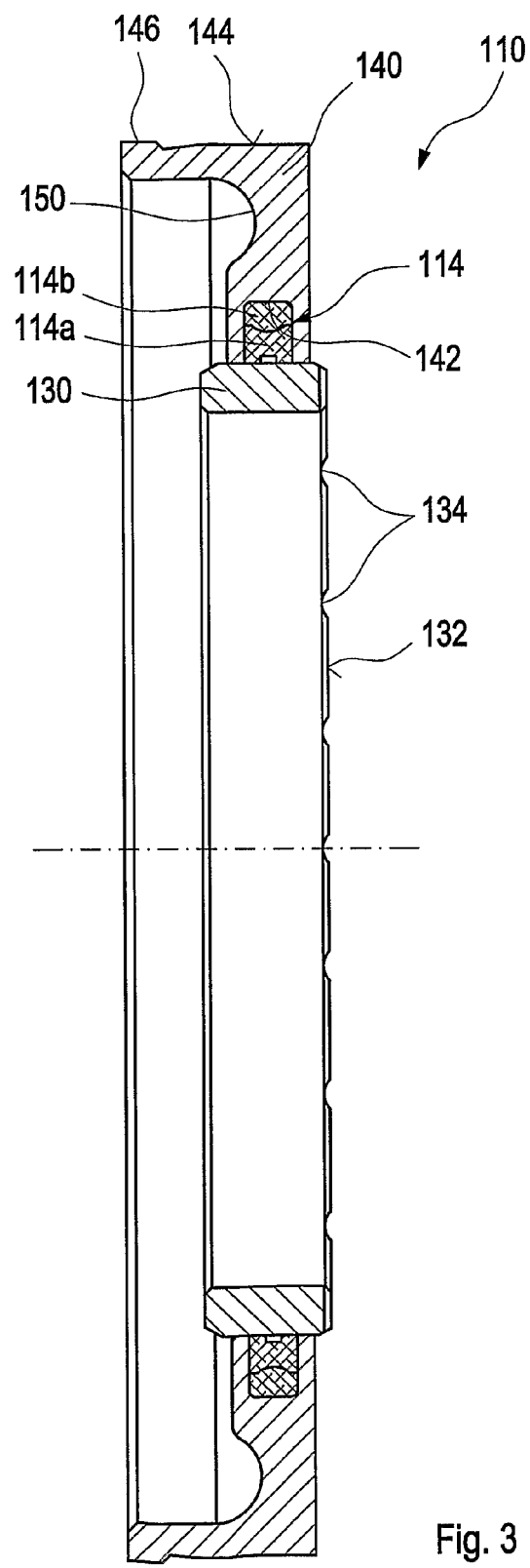
FIG. 3 a cut through an example embodiment of a second seal.

FIG. 3 display said second seal 110 in more detail. The second seal 110 comprises a soft seal portion 114 comprising a softer outer segment 114b and a stiffer inner segment 114a. The soft seal portion 114 is arranged in a groove 142 of a rigid housing 140. The soft seal portion 114 surrounds a rigid spacer ring 130 which has radial slots 134 arranged at its ring surface 132 facing the first seal 100. The slots 134 let pass the oil to the drainage channel 26.

The cylindrical outer surface 144 of the housing has a projecting rim 146 which is provided for engaging a corresponding recess in a radial outer wall of the hydraulic oil passage 60 for axially securing the second seal 110 in the hydraulic oil passage 60. The axial oriented groove 150 is intended to provide a transition portion for a change of direction of a oil flow in the hydraulic oil passage 60.

Figure 4:
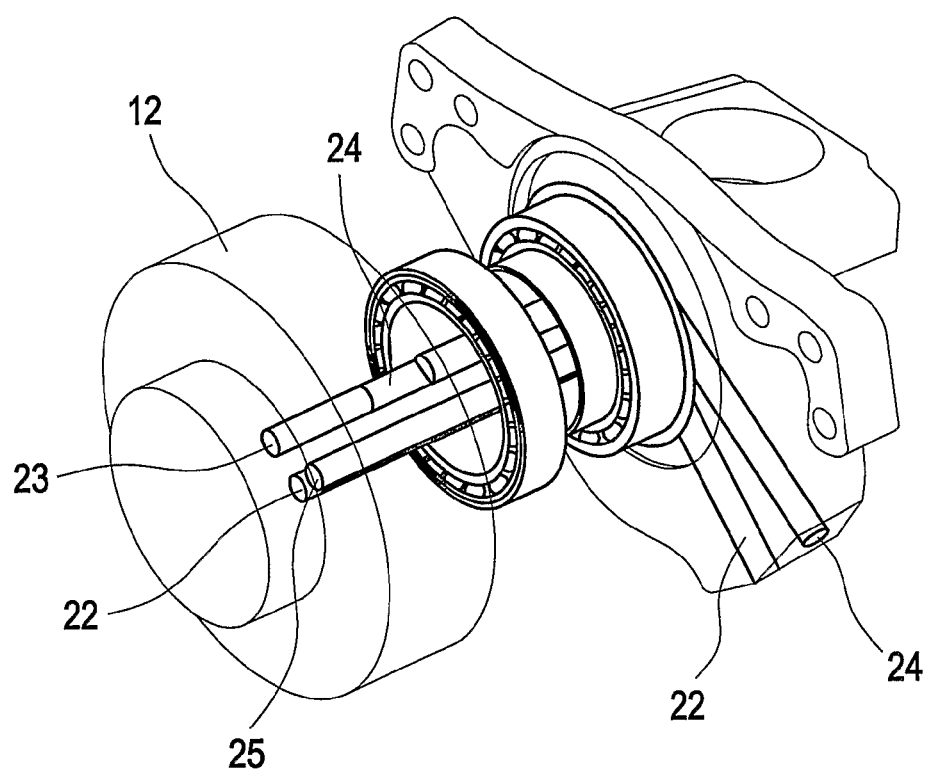
FIG. 4 a perspective view of an arrangement of oil channels in a knuckle of a wheel hub arrangement shown in FIGS. 1a, 1b with partially transparent components.

FIG. 4 displays a perspective view of an example embodiment of an arrangement of hydraulic oil channels 22, 23, 24, 25 inside a steering knuckle 20 of a wheel hub arrangement 10 shown in FIGS. 1a, 1b which are made visible by making surrounding components partially or completely transparent. The body of the steering knuckle 20 itself is not depicted in this Figure for clarity reasons.

The hydraulic oil channel 23 is provided for supplying hydraulic oil at a high pressure to the hydraulic motor 12 in its operation mode. As can be seen, the hydraulic oil may enter the hydraulic motor 12 in a central region of the steering knuckle 20. Hydraulic oil channel 25 is provided for discharging the oil from the hydraulic motor 12 in its operation mode. Channel 22 supplies hydraulic oil to the hydraulic motor 12 in the freewheeling mode at speeds above the speed limit for operating the hydraulic motor 12 for establishing a counter pressure for Deactivating the pistons in the hydraulic motor 12. Channel 24 is used for draining oil from the high pressure and low pressure sections 60b, 60a of the hydraulic oil passage 60 (FIGS. 1a, 1b, FIG. 2). As can be seen in combination with FIG. 2, and exit 26a (FIG. 2) of the hydraulic oil before the first seal (FIGS. 1a, 1b, FIG. 2) is provided at an outer surface of the steering knuckle 20.

During the operation mode of the hydraulic motor 12 the oil pressure inside the hydraulic motor 12 amounts up to several hundreds bar, whereas the pressure in the hydraulic oil passage 60 is at ambient pressure ("zero" pressure). The operation mode of the hydraulic motor 2 is restricted to a low speed range below a speed limit of typically 30 km/h. A rotational speed of the second seal 110, particularly of the soft seal portion 114, is in the range below 1 m/s, for instance.

During the freewheeling mode of the hydraulic motor 12 the pressure in the high pressure section 60b of the hydraulic oil passage 60 amounts to a few bar, e.g. about 3 bar, whereas the pressure in the low pressure section 60a does not exceed e.g. 1 bar. A rotational speed of the second seal 110, particularly of the soft seal portion 14, is in the range between 2-3 m/s.

In the transition phase between the freewheeling mode of the hydraulic motor 12 and its operation mode at the speed limit of e.g. 30 km/h when the hydraulic motor 12 is switched on, causing an occurrence of pressure spikes in the hydraulic oil passage 60, particularly in the high pressure section 60b, the pressure in the high pressure section 60b can amount to 70 to 100 bar, for instance, whereas the pressure in the low pressure section 60a remains low, e.g. at or below 1 bar. The rotational speed of the second seal 110, particularly of the soft seal portion 114, is in the range below 1 m/s, for instance.

The invention favourably allows a compact arrangement and the usage of standard wheel bearings which can be lubricated with grease at lower operating pressures than hydraulic oil pressure during operation. As a consequence, standard soft seals with reliable tightness can be used for the bearing section 50.

The invention claimed is:

1. A wheel hub unit comprising
    a wheel hub,
    a hydraulic motor,
    a bearing section comprising two grease lubricated bearings for supporting the wheel hub and the hydraulic motor, and
    a first seal, the bearing section being sealed toward the hydraulic motor with the first seal protecting the two grease lubricated bearings from hydraulic oil from the hydraulic motor.

2. The wheel hub unit according to claim 1, wherein the wheel hub unit comprises means for protecting the first seal from pressure spikes transmittable by the hydraulic oil of the hydraulic motor.

3. The wheel hub unit according to claim 1, wherein the wheel hub unit comprises a steering knuckle, which is operatively connected to the hydraulic motor, and the two grease lubricated bearings are arranged between the steering knuckle and a rotational part in the wheel hub unit.

4. The wheel hub unit according to claim 1, wherein the hydraulic motor is arranged beside the two grease lubricated bearings in an axial direction of the wheel hub unit.

5. The heel hub unit according to claim 1, wherein each of the two grease lubricated bearings is formed by a taper rolling bearing.

6. The wheel hub unit according to claim 1, wherein the hydraulic motor is formed by a radial piston hydraulic motor.

7. The wheel hub unit according to claim 1, wherein the first seal is a soft seal.

8. The wheel hub unit according to claim 1, wherein the first seal is positioned between an inner ring of a bearing of the two grease lubricated bearings and a rotational part in the wheel hub unit.

9. A wheel hub unit comprising
a wheel hub,
a hydraulic motor,
at least one bearing for supporting the wheel hub and the hydraulic motor, and
a first seal for protecting the at least one bearing from hydraulic oil from the hydraulic motor,
wherein the protection means comprises a passage between the hydraulic motor and the first seal, wherein hydraulic oil from the hydraulic motor may enter the passage, and that the passage is configured for protecting the first seal from pressure spikes transmittable by the hydraulic oil of the hydraulic motor.

10. The wheel hub unit according to claim 9, wherein the hydraulic oil passage comprises a region which causes a change of direction of the hydraulic oil for protecting the first seal from the pressure spikes.

11. The wheel hub unit according to claim 9, wherein the hydraulic oil passage is arranged so that an entrance of the hydraulic oil passage at the hydraulic motor is positioned at a different radial position than an exit of the hydraulic oil passage at the first sealing.

12. The wheel hub unit according to claim 9, wherein the hydraulic oil passage comprises a first section extending in an axial direction of the wheel hub unit and a second section extending in a radial direction of the wheel hub unit.

13. The wheel hub unit according to claim 9, wherein the protection means comprises a second seal, which is arranged between the hydraulic motor and the first seal for protecting the first seal from pressure spikes transmittable by the hydraulic oil of the hydraulic motor, and the second seal is arranged in the hydraulic oil passage.

14. The wheel hub unit according to claim 13, wherein the second seal is configured to separate the oil passage in a high pressure region between the hydraulic motor and the second seal and a low pressure region between the second seal and the first seal.

15. A wheel hub unit comprising
a wheel hub,
a hydraulic motor,
at least one bearing for supporting the wheel hub and the hydraulic motor, and
a first seal for protecting the at least one bearing from hydraulic oil from the hydraulic motor,
wherein the protection means comprises a second seal, which is arranged between the hydraulic motor and the first seal for protecting the first seal from pressure spikes transmittable by the hydraulic oil of the hydraulic motor.

16. The wheel hub unit according to any one of claims 15-14, wherein a first drainage channel is arranged between the first seal and the second seal and/or a second drainage channel is arranged between the hydraulic motor and the second seal.

17. The wheel hub unit according to claim 15, wherein the second seal comprises a soft seal portion.

18. The wheel hub unit according to claim 17, wherein the soft seal portion is arranged at a radial inner side of a housing which is connected to the wheel hub and configured to rotate with the wheel hub.

19. The wheel hub unit according to claim 17, wherein the soft seal portion is arranged around a spacer ring which is connected in a rotatable fixed manner to a steering knuckle.

20. The wheel hub unit according to claim 19, wherein the second seal comprises a leakage channel with a predefined leakage, and
the leakage channel is arranged between the soft seal portion and the spacer ring.

21. The wheel hub unit according to claim 15, wherein the second seal comprises a leakage channel with a predefined leakage.

22. The wheel hub unit according to claim 21, wherein a radial inner surface of the first seal is positioned on a radial larger distance from a wheel hub rotational axis than the leakage channel.

23. A wheel hub unit comprising
a wheel hub,
a hydraulic motor,
a bearing section comprising two grease lubricated bearings for supporting the wheel hub and the hydraulic motor, and
a seal, the bearing section being sealed toward the hydraulic motor with the first seal protecting the two grease lubricated bearings from hydraulic oil from the hydraulic motor, the seal comprising a rigid housing adapted to rotate with the wheel hub about a stationary steering knuckle.

* * * * *